(12) United States Patent
Sakurai et al.

(10) Patent No.: US 8,208,262 B2
(45) Date of Patent: Jun. 26, 2012

(54) WINDOW BASE MATERIAL, CARD WITH EMBEDDED MODULE, AND MANUFACTURING METHOD OF CARD WITH EMBEDDED MODULE

(75) Inventors: Takahiro Sakurai, Toyko (JP); Yuichi Ito, Tokyo (JP)

(73) Assignee: Toppan Forms Co., Ltd., Tokyo (JP)

( * ) Notice: Subject to any disclaimer, the term of this patent is extended or adjusted under 35 U.S.C. 154(b) by 458 days.

(21) Appl. No.: 12/447,910

(22) PCT Filed: Nov. 7, 2007

(86) PCT No.: PCT/JP2007/071660
§ 371 (c)(1),
(2), (4) Date: Apr. 30, 2009

(87) PCT Pub. No.: WO2008/056714
PCT Pub. Date: May 15, 2008

(65) Prior Publication Data
US 2010/0085718 A1    Apr. 8, 2010

(30) Foreign Application Priority Data

Nov. 7, 2006  (JP) .................................. 2006-301520
Nov. 7, 2006  (JP) .................................. 2006-301522

(51) Int. Cl.
*H05K 1/14*    (2006.01)
(52) U.S. Cl. ........................................ 361/737; 361/761
(58) Field of Classification Search .................. 361/760, 361/761, 737
See application file for complete search history.

(56) References Cited

U.S. PATENT DOCUMENTS 5,184,209 A * 2/1993 Kodai et al. .................... 257/679
6,942,156 B2 * 9/2005 Ohta et al. ..................... 235/492
7,278,586 B2 * 10/2007 Takahashi et al. ............ 235/494
(Continued)

FOREIGN PATENT DOCUMENTS
JP   62-103682   5/1987
(Continued)

OTHER PUBLICATIONS

Office Action issued Aug. 26, 2011, in Korean Patent Application No. 10-2009-7009313 with English translation.
(Continued)

*Primary Examiner* — Hung S Bui
(74) *Attorney, Agent, or Firm* — Oblon, Spivak, McClelland, Maier & Neustadt, L.L.P.

(57) ABSTRACT

The window base material of the present invention is provided with an intermediate layer having a window section composed of transparent resin and a colored section composed of colored resin surrounding the window section, and a transparent first base material and second base material which sandwich the intermediate layer. The card with embedded module of the present invention is provided with a module having a display element, an adhesive layer covering the module, and a paired third base material and fourth base material which sandwich the module with interposition of the adhesive layer, wherein the third base material is composed of the window base material, and the display section of the display element is disposed so as to face the window section of the window base material. According to the present invention, a card with embedded module is offered, which incorporates a display element as an electronic component, which renders the display section of this display element visible from the outside, and which is easy to manufacture.

2 Claims, 3 Drawing Sheets

U.S. PATENT DOCUMENTS

| | | | |
|---|---|---|---|
| 7,370,807 B2 * | 5/2008 | Buursma et al. | 235/492 |
| 7,459,341 B2 * | 12/2008 | Usami | 438/107 |
| 7,561,052 B2 * | 7/2009 | Arai et al. | 340/572.7 |
| 2005/0019989 A1 | 1/2005 | Droz | |
| 2006/0261171 A1 | 11/2006 | Buursma et al. | |

FOREIGN PATENT DOCUMENTS

| | | |
|---|---|---|
| JP | 8-147436 | 6/1996 |
| JP | 9 311922 | 12/1997 |
| JP | 10-129163 | 5/1998 |
| JP | 10-232910 | 9/1998 |
| JP | 2001 266104 | 9/2001 |
| JP | 2001 338273 | 12/2001 |
| JP | 2003-208582 | 7/2003 |
| JP | 2003-288573 | 10/2003 |
| JP | 2003-337321 | 11/2003 |
| JP | 2005-100150 | 4/2005 |
| JP | 2005-165794 | 6/2005 |
| JP | 2005 531126 | 10/2005 |
| JP | 2006-68987 | 3/2006 |
| JP | 2006 518898 | 8/2006 |
| KR | 10-2003-0006092 A | 1/2003 |
| WO | WO 2006/046214 A1 | 5/2006 |

OTHER PUBLICATIONS

Notice of Allowance issued Oct. 25, 2011, in Japanese Patent Application No. 2006-301520 (with English-language translation).

Office Action issued Oct. 25, 2011, in Japanese Patent Application No. 2006-301522 (with English-language translation).

* cited by examiner under the display section, of the aforementioned base material is composed of...

WINDOW BASE MATERIAL, CARD WITH EMBEDDED MODULE, AND MANUFACTURING METHOD OF CARD WITH EMBEDDED MODULE

TECHNICAL FIELD

The present invention relates to a card with embedded module, which incorporates a module provided with an electronic component such as an IC chip. In particular, it relates to a card with embedded module, which incorporates a display element as an electronic component, and in which the display section of this display element is visible from the outside.

In addition, the present invention relates to a window base material used in the aforementioned card with embedded module, a card with embedded module provided therewith, and a manufacturing method of a card with embedded module.

This application claims priority from Japanese Patent Application No. 2006-301520 and Japanese Patent Application No. 2006-301522 filed on Nov. 7, 2006, the content of which is incorporated herein by reference.

BACKGROUND ART

Heretofore, with respect to cards such as IC cards which incorporate modules provided with electronic components such as IC chips and diodes, a card 100 as shown in FIG. 4 has been offered in order to render the electronic component embedded in the card visible.

This card 100 is configured from a module 101, an adhesive layer 102 composed of a transparent adhesive agent that covers this module 101, and paired base material 103 and 104 that sandwich the module 101 with interposition of this adhesive layer 102 (see, e.g., Patent Document 1).

With this card 100, in order to make the embedded module 101 visible from the outside, it is indispensable to combine the transparent adhesive layer 102 and transparent base material 103 and 104.

Patent Document 1: Japanese Translation of PCT Application, Publication No. 2005-531126.

DISCLOSURE OF INVENTION (Problems that the Invention is to Solve)

Incidentally, as the card 100 shown in FIG. 4 is formed by laminating the module 101 and base material 103 and 104 with interposition of an adhesive agent, it happens that air bubbles and foreign matter are incorporated therein, and that adhesion blemishes occur in the adhesive layer 102.

As the adhesive layer 102 and base material 103 and 104 of the card 100 are transparent, air bubbles and foreign matter incorporated therein or adhesion blemishes in the adhesive layer 102 are visible from the outside. Consequently, there is the problem that the conforming product rate decreases due to defects in external appearance.

In a manufacturing method of the card, techniques such as vacuum defoaming in order to correct defects pertaining to the incorporation of air bubbles and foreign matter, adhesion blemishes and the like may be employed, but there is the problem that much cost is incurred due to the labor required by these techniques.

In recent years, there has been demand for a card with embedded module which incorporates a display element as an electronic component, and in which the display section of this display element is visible from the outside, but due to problems such as the aforementioned incorporation of air bubbles and foreign matter, cards with visible display sections have not been easily obtainable.

The present invention was made in light of the aforementioned circumstances, and its object is to offer a card with embedded module which incorporates a display element as an electronic component, which renders the display section of this display element visible from the outside, and which is easy to manufacture.

(Means for Solving the Problems)

The window base material of the present invention is provided with an intermediate layer having a window section composed of transparent resin and a colored section composed of colored resin surrounding the pertinent window section, and a transparent first base material and second base material which sandwich the pertinent intermediate layer.

The card with embedded module of the present invention is provided with a module having a display element, an adhesive layer covering the pertinent module, and a third base material and fourth base material sandwiching the aforementioned module with interposition of the pertinent adhesive layer, wherein at least one or the other of the aforementioned third base material and fourth base material is composed of the window base material of the present invention, and the display section of the aforementioned display element is disposed so as to face the window section of the aforementioned window base material.

A manufacturing method of the card with embedded module of the present invention is the manufacturing method of a card with embedded module provided with a module having a display element, an adhesive layer covering the pertinent module, and a third base material and fourth base material sandwiching the aforementioned module with interposition of the pertinent adhesive layer.

This method includes: a step in which an intermediate layer is formed by providing a colored section composed of colored resin so as to surround a window section composed of transparent resin, the pertinent intermediate layer is sandwiched between a transparent first base material and second base material, and window base material is formed by integrating the aforementioned first base material and second base material with the aforementioned intermediate layer by hot-pressing treatment; a step in which the aforementioned window base material is used as at least one or the other of the aforementioned third base material and fourth base material, and an adhesive agent constituting the aforementioned adhesive layer is applied to one face of at least one or the other of the aforementioned third base material and fourth base material; a step in which the aforementioned module is disposed on one face of the aforementioned window base material so that the display section of the aforementioned display element faces the window section of the aforementioned window base material; and a step in which the aforementioned module and the aforementioned adhesive agent are sandwiched by the aforementioned third base material and fourth base material, after which the aforementioned third base material, the aforementioned fourth base material, the aforementioned module and the aforementioned adhesive agent are integrated by hot-pressing treatment.

The card with embedded module of the present invention is provided with a module having a display element, an adhesive layer covering the pertinent module, and paired base material sandwiching the aforementioned module with interposition of the pertinent adhesive layer, wherein the display section of the aforementioned display element is fixed to the aforementioned base material with interposition of a transparent viscous layer, at least the base material on the aforementioned display section side of the aforementioned paired base material is transparent, and the aforementioned adhesive layer is colored.

(Effects of the Invention)

According to the window base material of the present invention, as there is provision of an intermediate layer having a window section composed of transparent resin and a colored section composed of colored resin surrounding the pertinent window section, and of a transparent first base material and second base material which sandwich the pertinent intermediate layer, it is possible to render only the window section optically transmissive without creating a print layer or film coating on the surface of the first base material or second base material. Accordingly, if this window base material is used as the card base material, it is possible to render visible from the outside only a prescribed portion of internal components such as the module which are embedded in the card.

According to the card with embedded module of the present invention, as this is a card with embedded module provided with a module having a display element, an adhesive layer covering the pertinent module, and a third base material and fourth base material sandwiching the aforementioned module with interposition of the pertinent adhesive layer, wherein at least one or the other of the aforementioned third base material and fourth base material is composed of the window base material of the present invention, and the display section of the aforementioned display element is disposed so as to face the window section of the aforementioned window base material, the display section of the display element is visible from the outer face of the window base material. Moreover, as the region apart from the window section is concealed by the colored section of the window base material, it is possible to obscure air bubbles and foreign matter incorporated into the adhesive layer, or adhesion blemishes in the adhesive layer. Accordingly, not only is it possible to prevent a reduction in the conforming product rate of cards with embedded modules due to defects in external appearance, but it is also possible to protect the secrecy of the internal components of the card.

According to the manufacturing method of the card with embedded module of the present invention, the manufacturing method pertains to a card with embedded module provided with a module having a display element, an adhesive layer covering the pertinent module, and a third base material and fourth base material sandwiching the aforementioned module with interposition of the pertinent adhesive layer, and it includes: a step in which an intermediate layer is formed by providing a colored section composed of colored resin so as to surround a window section composed of transparent resin, the pertinent intermediate layer is sandwiched between a transparent first base material and second base material, and window base material is formed by integrating the aforementioned first base material and second base material with the aforementioned intermediate layer by hot-pressing treatment; a step in which the aforementioned window base material is used as at least one or the other of the aforementioned third base material and fourth base material, and an adhesive agent constituting the aforementioned adhesive layer is applied to one face of at least one or the other of the aforementioned third base material and fourth base material; a step in which the aforementioned module is disposed on one face of the aforementioned window base material so that the display section of the aforementioned display element faces the window section of the aforementioned window base material; and a step in which the aforementioned module and the aforementioned adhesive agent are sandwiched by the aforementioned third base material and fourth base material, after which the aforementioned third base material, the aforementioned fourth base material, the aforementioned module and the aforementioned adhesive agent are integrated by hot-pressing treatment. Consequently, as the first base material and second base material closely adhere to the transparent resin constituting the window section, it is possible to form a window base material that has a window section with excellent optical transmissivity, even with interposition of a first base material and second base material. Moreover, as a result of hot-pressing treatment, it is possible to render the surface of the base material constituting the outermost face (outer face) as a glossy surface. In addition, as the window base material is used, there is no need to conduct surface treatment such as printing or film coating with respect to the surface of the base material constituting the outermost face in order to conceal the internal components of the card. Accordingly, it is possible to simply and inexpensively fabricate a card with embedded module of excellent external appearance.

The card with embedded module of the present invention is provided with a module having a display element, an adhesive layer covering the pertinent module, and paired base material sandwiching the aforementioned module with interposition of the pertinent adhesive layer. Furthermore, the display section of the aforementioned display element is fixed to the aforementioned base material with interposition of a transparent viscous layer, at least the base material on the display section side is transparent, and the aforementioned adhesive layer is colored. Therefore, only the portion of base material superimposed over the display section is transparent, and this portion constitutes the display window section, thereby enabling the display section to be visible from the outer face side of the base material. Moreover, as the display section of the display element is fixed to the base material by a viscous layer, air bubbles and foreign matter are not incorporated between the viscous layer and the display section/base material, and adhesion blemishes do not occur. Furthermore, as the adhesive layer is colored, and as it exists in the region apart from the aforementioned display window section between the paired base material, it is possible to obscure air bubbles and foreign matter incorporated into the adhesive layer, or adhesion blemishes produced in the adhesive layer. Accordingly, a lowering in the conforming product rate of cards with embedded modules due to defects in external appearance can be prevented.

BRIEF DESCRIPTION OF THE REFERENCE SYMBOLS

10 . . . window base material, 11 . . . colored section, 12 . . . window section, 13 . . . intermediate layer, 14, 35 . . . first base material, 15, 36 . . . second base material, 20, 30 . . . card with embedded module, 21, 31 . . . foundational base material, 22, 32 . . . display element, 23, 33 . . . module, 24, 34 . . . adhesive layer, 25 . . . colored base material, 26 . . . transparent base material, 27 . . . third base material, 28 . . . fourth base material, 37 . . . viscous layer.

BEST MODE FOR CARRYING OUT THE INVENTION

A description will now be given of preferred embodiments of the window base material of the present invention, a card with embedded module provided therewith, and a manufacturing method of the card with embedded module.

These embodiments are described with specificity in order to give a better understanding of the intent of the present invention, but they do not limit the present invention absent a specific designation to that effect.

(Window Base Material)

Figure 1A:
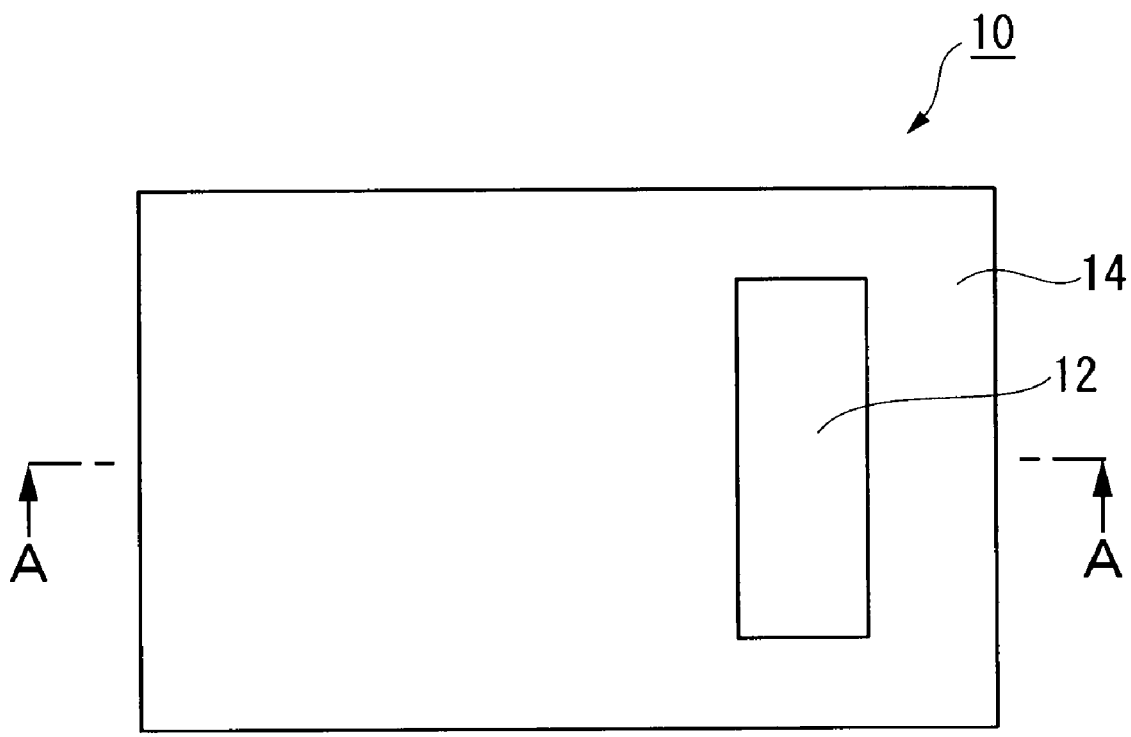
FIG. 1A is a schematic plan view showing an embodiment of the window base material pertaining to the present invention.
Figure 1B:
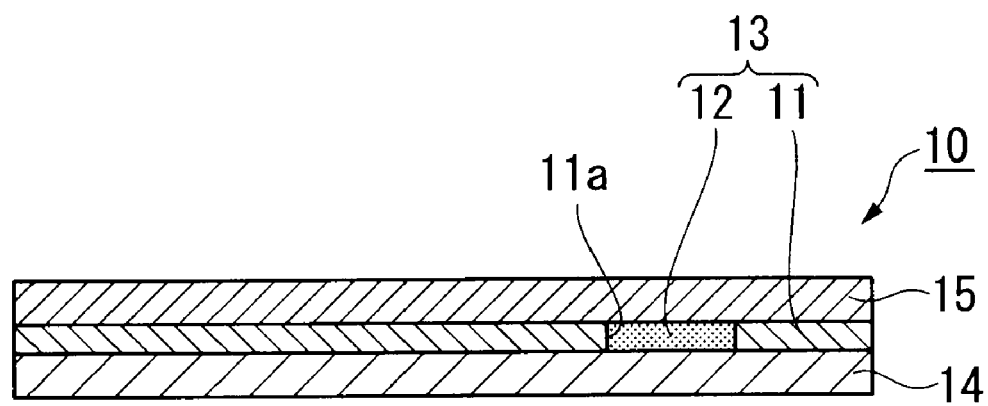
FIG. 1B is a sectional view along the A-A line in FIG. 1A showing an embodiment of the window base material pertaining to the present invention.

FIGS. 1A and 1B are schematic diagrams which show one embodiment of the window base material pertaining to the present invention. FIG. 1A is a plan view, and FIG. 1B is a sectional view along the A-A line in FIG. 1A.

In FIGS. 1A and 1B, code number 10 indicates window base material, 11 indicates a colored section, 12 indicates a window section, 13 indicates an intermediate layer, 14 indicates a first base material, and 15 indicates a second base material.

The window base material 10 of this embodiment is roughly configured from a window section 12 composed of transparent resin, an intermediate layer 13 having a colored section 11 composed of colored resin surrounding the window section 12, and a first base material 14 and second base material 15 composed of transparent resin sandwiching the intermediate layer 13.

As the colored section 11, a base material made of formed resin dyed to the arbitrary color by adding a colorant may be used.

As the resin constituting the colored section 11, polyester resins such as polyethylene terephthalate (PET), glycol-modified polyethylene terephthalate (PET-G), polybutylene terephthalate (PBT), polyethylene naphthalate (PEN); polyolefin resins such as polyethylene (PE) and polypropylene (PP); polyamide resins such as nylon 6 and nylon 6,6; vinyl polymers such as polyvinyl chloride (PVC), ethylene vinyl acetate copolymer, polyvinyl alcohol, and vinilon; acrylic resins such as methyl polymethacrylate, ethyl polymethacrylate, ethyl polyacrylate, and butyl polyacrylate; polystyrene; polycarbonate (PC); polyallylate; and polyimide, may be used.

As the colorant contained in the colored section 11, conventionally known inorganic pigments, organic pigments, dyes, and the like, may be used.

As the transparent resin constituting the window section 12, liquid transparent resin, transparent resin sheet, and so on, may be used.

As liquid transparent resin, thermo-hardening resin, ultraviolet-ray hardening resin, electronic-ray hardening resin, and so on may be used. A 2-pack hardening adhesive, which is hardened by reacting a hardener with a main ingredient without application of external conditions, may be used As thermo-hardening resin, for example, phenol resin, epoxy resin, polyurethane hardening resin, urea resin, melamine resin, acrylic reactive resin, and so on, may be used.

As ultraviolet-ray hardening resin, ultraviolet-ray hardening acrylic resin, ultraviolet-ray hardening urethane acrylate resin, ultraviolet-ray hardening polyester acrylate resin, ultraviolet-ray hardening polyurethane resin, ultraviolet-ray hardening epoxy acrylate resin, ultraviolet-ray hardening imide acrylate resin, and so on, may be employed.

As electronic-ray hardening resin, electronic-ray hardening acrylic resin, electronic-ray hardening urethane acrylate resin, electronic-ray hardening polyester acrylate resin, electronic-ray hardening polyurethane resin, electronic-ray hardening epoxy acrylate resin, cationic hardening resin, and so on, may be employed.

As a 2-pack hardening adhesive, mixtures of polyester resin and polyisocyanate prepolymer, mixtures of polyester polyol and polyisocyanate, mixtures of urethane and polyisocyanate, and so on, may be employed.

As resin constituting the transparent resin sheet, resin identical to the resin constituting the aforementioned colored section 11 is used. Among these resins, from the standpoints of transparency and fusability with the aforementioned intermediate layer 13 by hot-pressing treatment, it is preferable to use thermoplastic resins such as polyvinyl chloride (PVC), polyethylene terephthalate (PET), glycol-modified polyethylene terephthalate (PET-G), and so on.

Moreover, the transparent resin constituting the window section 12 may have either colorless transparency or colored transparency, but colorless transparency is preferable from the standpoints of enabling a high degree of optical transmissivity and facilitating recognition of information via the window section 12.

As the first base material 14 and second base material 15, base material that is transparent and that has excellent optical transmissivity is used. One may use base material composed of polyester resin such as polyethylene terephthalate (PET), glycol-modified polyethylene terephthalate (PET-G), polybutylene terephthalate (PBT), and polyethylene napthalate (PEN); base material composed of polyolefin resin such as polyethylene (PE) and polypropylene (PP); base material composed of ethylene polyfluoride resin such as vinyl polyfluoride, vinylidene polyfluoride, and ethylene poly-4-fluoride; base material composed of polyamide resin such as nylon 6, and nylon 6,6; base material composed of vinyl polymer such as polyvinyl chloride (PVC), ethylene vinyl acetate copolymer, polyvinyl alcohol, and vinilon; base material composed of acrylic resin such as methyl polymethacrylate, ethyl polymethacrylate, ethyl polyacrylate, and butyl polyacrylate; base material composed of polystyrene; base material composed of polycarbonate (PC); base material composed of polyallylate; base material composed of polyimide; base material composed of paper such as high-quality paper, thin paper, glassine paper, parchment paper; and so on. Among these base materials, from the standpoints of mechanical strength, dimensional stability and solvent resistance, it is preferable to use base material composed of polyethylene terephthalate (PET), glycol-modified polyethylene terephthalate (PET-G), polyethylene napthalate (PEN), and the like. In terms of transparency, processing suitability and cost, base material composed of polyethylene terephthalate (PET) or glycol-modified polyethylene terephthalate (PET-G) is particularly preferable.

The first base material 14 and second base material 15 may have either colorless transparency or colored transparency, but colorless transparency is preferable from the standpoints of enabling a high degree of optical transmissivity and facilitating recognition of information via the window section 12.

As the window base material 10 of this embodiment is composed of the window section 12 composed of transparent resin, the intermediate layer 13 having a colored section 11 composed of colored resin surrounding the window section 12, and the transparent base material 14 and base material 15 sandwiching this intermediate layer 13, it is possible to render only the window section 12 optically transmissive without creating a print layer or film coating on the surface of the first base material or second base material. Accordingly, if this window base material 10 is used as the card base material, it is possible to render visible from the outside only a prescribed portion of internal components such as the module which are embedded in the card.

In this embodiment, window base material 10 composed of the intermediate layer 13, first base material 14, and second base material 15 was exemplified, but the window base material of the present invention is not limited thereto. With respect to the window base material of the present invention, it is also acceptable to form a print layer—which shows information such as lettering, symbols, designs and patterns—between an intermediate layer and a first base material and a second base material Moreover, there are no particular limitations on the size, form or layout of the window section 12, and this may be suitably set according to necessity.

(Manufacturing Method of Window Base Material)

Next, the manufacturing method of the window base material of this embodiment is described with reference to FIG. 1A and FIG. 1B, First, an intermediate layer is formed by creating a colored section 11 composed of colored resin so as to surround the window section 12 composed of transparent resin.

In this manufacturing step, to form the intermediate layer 13, for example, a colored section 11 is prepared by creating a through-member 11a pierced in the thickness direction at a specified position; the intermediate layer 13 is formed by packing liquid transparent resin constituting the window section 12 into the interior of the through-member 11a, or by inserting a transparent resin sheet therein, as a result, the intermediate layer 13 is formed.

In this manufacturing step, in the case where liquid transparent resin is used, hardening is conducted by heating the liquid transparent resin, or by irradiating the liquid transparent resin with ultraviolet rays or electronic rays.

Next, the intermediate layer 13 is sandwiched between the first base material 14 and second base material 15, and the laminar body configured from the intermediate layer 13, first base material 14 and second base material 15 is subjected to hot-pressing treatment, whereby the intermediate layer 13, first base material 14 and second base material 15 undergo fusion bonding, thereby obtaining the window base material 10 by integration of the aforementioned laminar body. In this manufacturing step, the transparent resin constituting the window section 12 undergoes fusion bonding and coheres with the first base material 14 and second base material 15.

According to the manufacturing method of window base material of this embodiment, as the transparent resin constituting the window section 12 coheres with the first base material 14 and second base material 15, the window section 12 has excellent optical transmissivity via the first base material 14 and second base material 15. Moreover, the surfaces (outer faces) of the first base material 14 and second base material 15 are made into glossy surfaces by the aforementioned hot-pressing treatment. Merely subjecting the intermediate layer 13, first base material 14 and second base material 15 to adhesive bonding with use of an adhesive agent is not sufficient to produce a glossy surface with respect to the surfaces (outer faces) of the first base material 14 and second base material 15.

(Card with Embedded Module)

Figure 2A:
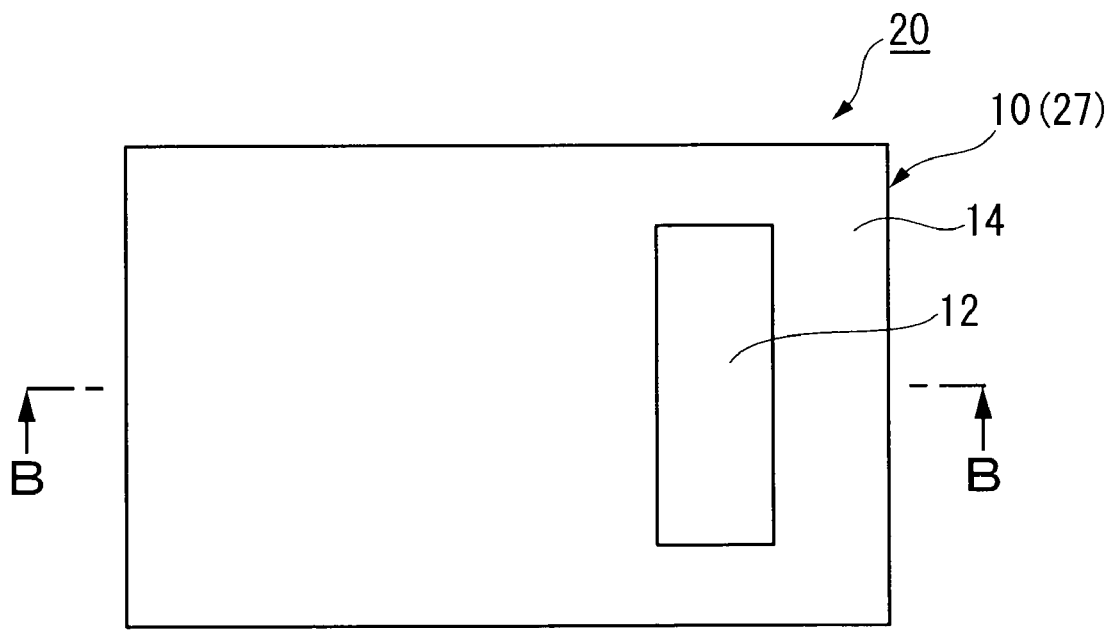
FIG. 2A is a schematic plan view showing an embodiment of the card with embedded module pertaining to the present invention.
Figure 2B:
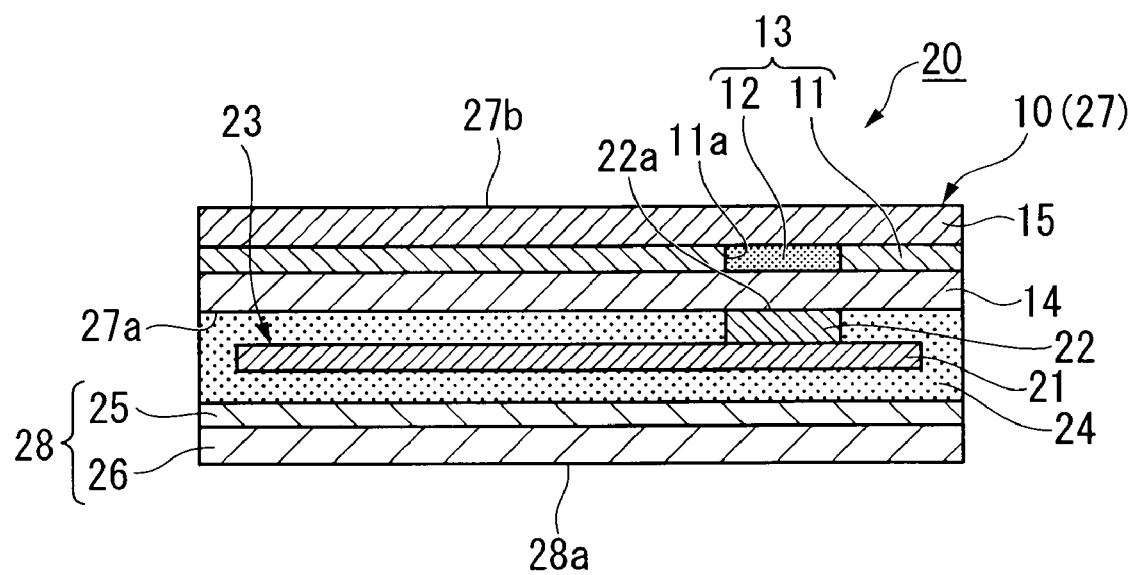
FIG. 2B is a sectional view along the B-B line in FIG. 2A showing an embodiment of the card with embedded module pertaining to the present invention.

FIG. 2A and FIG. 2B are schematic diagrams showing an embodiment of the card with embedded module pertaining to the present invention. FIG. 2A is a plan view, and FIG. 2B is a sectional view along the B-B line of FIG. 2A.

In FIG. 2A and FIG. 2B, the same code numbers are given to components that are identical to those of the window base material 10 shown in FIG. 1A and FIG. 1B, and description thereof is omitted.

In FIG. 2A and FIG. 2B, code number 20 indicates a card with embedded module, 21 indicates a foundational base material, 22 indicates a display element, 23 indicates a module, 24 indicates an adhesive layer, 25 indicates colored base material, 26 indicates transparent base material, 27 indicates a third base material, and 28 indicates a fourth base material The card with embedded module 20 of this embodiment is schematically configured from a module 23 having a display element 22, an adhesive layer 24 covering this module 23, and a paired third base material 27 and fourth base material 28 that sandwich the module 23 with interposition of this adhesive layer 24.

In this card with embedded module 20, the third base material 27 is composed of the aforementioned window base material 10. The module 23 is schematically configured from the foundational base material 21, and display element 22 mounted on the foundational base material 21 and having a display section 22a.

In this card with embedded module 20, the display section 22a of the display element 22 is disposed so that it faces the window section 12 of the window base material 10 (third base material 27). Furthermore, the display section 22a of the display element 22 is bonded and fixed to the face (hereinafter called "inner face") 27a of the third base material 27 that faces the module 23 with interposition of a transparent viscous layer (not illustrated) or a transparent adhesive agent constituting the adhesive layer 24. Thus, as the display section 22a of the display element 22 is fixed to the inner face 27a of the third base material 27 (window base material 10) with interposition of a transparent viscous layer or transparent resin constituting the adhesive layer 24, it is visible from an outer face 27b side of the third base material 27.

Moreover, the fourth base material 28 is configured from a colored base material 25, and a transparent base material 26 superimposed on this. With the colored base material 25 as the inner face (the face that is opposite the module 23), the fourth base material 28 is bonded to the adhesive layer 24.

As the base material 21, at least with respect to its surface layer, one or more materials may be selected from various conventionally known materials such as cloth, nonwoven cloth, matting, and paper—or combinations of these—composed of inorganic fiber such as glass fiber and alumina fiber; cloth, nonwoven cloth, matting, and paper—or combinations of these—composed of organic fiber such as polyester fiber and polyamide fiber; or composite base material molded by impregnating these with resin varnish; or plastic base material such as polyamide resin base material, polyester resin base material, polyolefin resin base material, polyimide resin base material, ethylene-vinyl alcohol copolymer base material, polyvinyl alcohol resin base material, polyvinyl chloride resin base material, polyvinilidine chloride resin base material, polystyrene resin base material, polycarbonate resin base material, acrylonitrile butadiene styrene copolymer resin base material, and polyester-sulfone resin base material; or material obtained by subjecting these to surface treatment such as matting treatment, corona discharge treatment, plasma treatment, ultraviolet-ray irradiation treatment, electronic-ray irradiation treatment, frame plasma treatment, ozone treatment, or various types of adhesion facilitating treatment. Among these, electrically insulated films or sheets composed of polyethylene terephthalate or polyimide are particularly well suited for use.

As the display element 22, electronic paper based on particle movement by superimposed voltage such as electrophoretic display; liquid crystal display (LCD); an electrochromic device (ECD); electroluminescence (EL); a light-emitting diode (LED); and so on, may be employed.

As the adhesive agent constituting the adhesive layer 24, an adhesive agent is used which is a liquid prior to use, and which is hardened by application of external conditions such as heating, ultraviolet-ray irradiation or electronic-ray irradiation. As this type of adhesive agent, thermo-hardening resin, ultraviolet-ray hardening resin, electronic-ray hardening resin, and so on, may be employed. As a 2-pack hardening adhesives, which are hardened by reacting a hardener with a main ingredient without application of external conditions, may also be employed. Among these, transparent adhesives with excellent optical transmissivity are preferable. If a transparent adhesive is used, there is no need to use a transparent viscous layer when fixing the display section 22a of the display element 22 to the inner face 27a of the third base material 27.

As thermo-hardening resin, for example, phenol resin, epoxy resin, polyurethane hardening resin, urea resin, melamine resin, acrylic reactive resin, mixtures of polyester resin and polyisocyanate prepolymer, mixtures of polyester polyol and polyisocyanate, mixtures of urethane and polyisocyanate, and so on, may be employed.

As ultraviolet-ray hardening resin, ultraviolet-ray hardening acrylic resin, ultraviolet-ray hardening urethane acrylate resin, ultraviolet-ray hardening polyester acrylate resin, ultraviolet-ray hardening polyurethane resin, ultraviolet-ray hardening epoxy acrylate resin, ultraviolet-ray hardening imide acrylate resin, and so on, may be employed.

As electronic-ray hardening resin, electronic-ray hardening acrylic resin, electronic-ray hardening urethane acrylate resin, electronic-ray hardening polyester acrylate resin, electronic-ray hardening polyurethane resin, electronic-ray hardening epoxy acrylate resin, cationic hardening resin, and so on, may be employed.

As 2-pack hardening adhesive, mixtures of polyester resin and polyisocyanate prepolymer, mixtures of polyester polyol and polyisocyanate, mixtures of urethane and polyisocyanate, and so on, may be employed.

As specific examples of such adhesives, a 2-pack epoxy adhesive composed of a main ingredient (brand name: Aron Mighty AP-317A, manufactured by Toagosei Co.) and a hardener (brand name: Aron Mighty AP-317B, manufactured by Toagosei Co.), and a 2-pack urethane adhesive composed of a main ingredient (brand name: MLT2900, manufactured by E-Tec Co.) and a hardener (brand name: G3021-B174, manufactured by E-Tec Co.), may be employed.

As the colored base material 25, material identical to that of the aforementioned colored section 11 is used.

As the transparent base material 26, material identical to that of the aforementioned transparent base material 14 and transparent base material 15 is used.

As the card with embedded module 20 of this embodiment is provided with the module 23 having the display element 22, the adhesive layer 24 covering this module 23, and the paired third base material 27 and fourth base material 28 sandwiching the module 23 with interposition of this adhesive layer 24, as the third base material 27 is composed of the aforementioned window base material 10, and as the display section 22a of the display element 22 is disposed so that it faces the window section 12 of the window base material 10, the display section 22a is visible from the outer face 27b side of the third base material 27. Moreover, by means of the colored section 11 of the window base material 10 and the colored base material 25 of the fourth base material 28, the region apart from the window section 12 is concealed, with the result that air bubbles and foreign matter incorporated into the adhesive layer 24 or adhesion blemishes produced in the adhesive layer 24 can be obscured. Accordingly, not only is it possible to prevent a reduction in the conforming product rate with respect to the cards with embedded modules 20 due to defects in external appearance, but it is also possible to protect the secrecy of the internal components of the card.

This embodiment exemplified a card with embedded module 20 using the third base material 27 as the window base material 10, but the card with embedded module of the present invention is not limited thereto. In the card with embedded module of the present invention, it is also acceptable to use the window base material of the present invention for both the paired third base material and fourth base material that sandwich the module with interposition of the adhesive layer. By employing this procedure, it is possible to achieve a card with embedded module wherein a module provided with a display element is respectively incorporated into both faces of the base material, and wherein the display sections of the display elements are visible from both faces (outermost faces) of the card.

(Manufacturing Method of Card with Embedded Module)

Next, the manufacturing method of the card with embedded module of this embodiment is described with reference to FIG. 2A and FIG. 2B.

First, a prescribed amount of the adhesive agent constituting the adhesive layer 24 is applied onto the inner face 27a of the third base material 27.

Subsequently, the display section 22a of the display element 22 is bonded and fixed to the inner face 27a of the third base material 27 with interposition of this adhesive agent so that it faces the window section 12a, whereby the module 23 is disposed at the prescribed position on the inner face 27a of the third base material 27.

Subsequently, after arranging the fourth base material 28 so that the module 23 and adhesive agent are sandwiched by the third base material 27 and fourth base material 28, the laminar body configured from the third base material 27, fourth base material 28, module 23, and adhesive agent is subjected to hot-pressing treatment from the outer face 27b side of the third base material 27 and the outer face 28a side of the fourth base material 28, with the result that the card with embedded module 20 is obtained by hardening of the adhesive agent, and integration of the aforementioned laminar body.

This embodiment exemplified the case where an adhesive agent constituting the adhesive layer 24 is applied to the inner face 27a of the third base material 27, but the manufacturing method of the card with embedded module of the present invention is not limited thereto. In the manufacturing method of the card with embedded module of the present invention, it is also acceptable to apply the aforementioned adhesive agent to either the inner face of the third base material or the inner face of the fourth base material, or to both the inner face of the third base material and the inner face of the fourth base material.

Moreover, in the manufacturing method of the card with embedded module of the present invention, when bonding and fixing the module to the inner face of the window base material, it is also acceptable to use a transparent viscosity agent formed according to the shape of the display section of the display element and the window section of the window base material.

According to the manufacturing method of the card with embedded module 20 of this embodiment, as the window base material 10 is used for the third base material 27, and as the fourth base material 28 provided with the colored base material 25 is used, there is no need to conduct surface treatment such as printing or coating application on the surface of the third base material 27 and fourth base material 28. Accordingly, it is possible to easily and inexpensively fabricate a card with embedded module having excellent external appearance. Furthermore, as the interior is concealed by the third base material 27 and fourth base material 28, when integrating the laminar body configured from the third base material 27, fourth base material 28, module 23 and adhesive agent, there is no need to use techniques such as vacuum defoaming.

Next, another preferred embodiment of the card with embedded module of the present invention is described.

This embodiment is concretely described in order to give a better understanding of the intent of the invention, but it does not limit the present invention absent a specific designation to that effect.

Figure 3A:
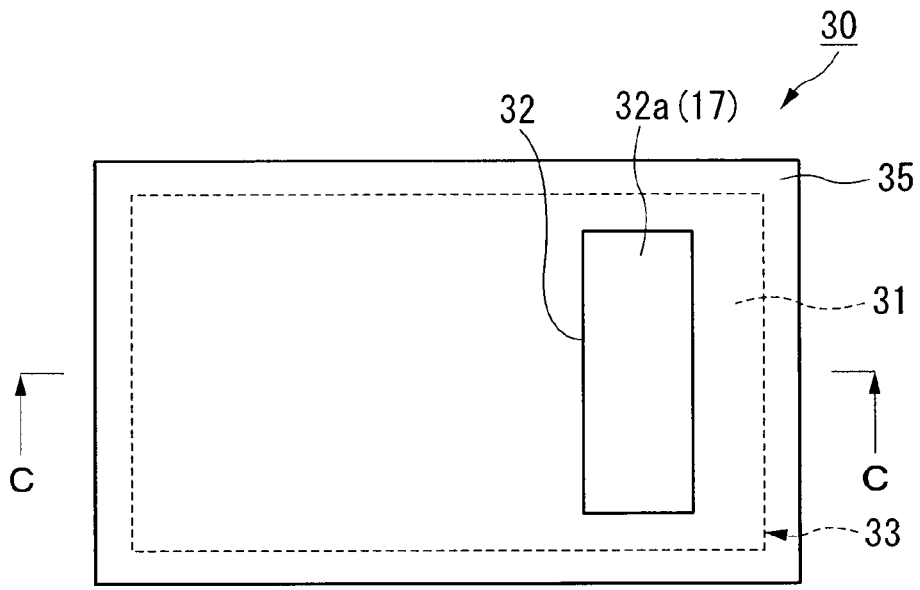
FIG. 3A is a schematic plan view showing an embodiment of the card with embedded module pertaining to the present invention.
Figure 3B:
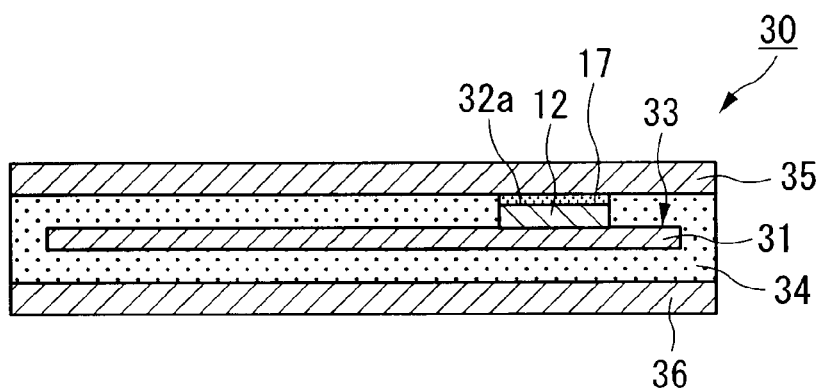
FIG. 3B is a sectional view along the C-C line in FIG. 3A showing an embodiment of the card with embedded module pertaining to the present invention.
Figure 4:
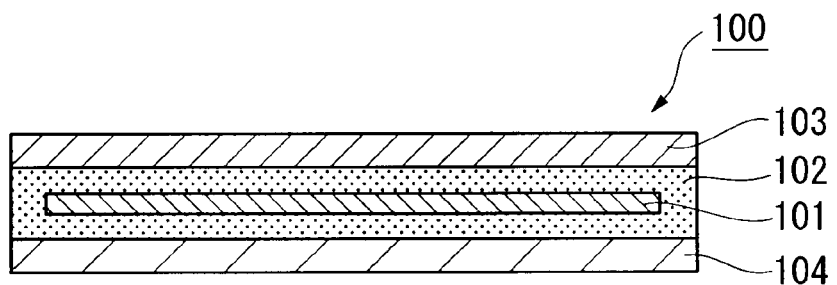
FIG. 4 is a schematic sectional view showing a conventional card with embedded module.

FIG. 3A and FIG. 3B are schematic diagrams which show an embodiment of the card with embedded module of the present invention. FIG. 3A is a plan view, and FIG. 3B is a sectional view along the C-C line of FIG. 3A.

In FIG. 3A and FIG. 3B, code number 30 indicates a card with embedded module, 31 indicates a foundational base material, 32 indicates a display element, 33 indicates a module, 34 indicates an adhesive layer, 35 indicates a first base material, 36 indicates a second base material, and 37 indicates a viscous layer.

The card with embedded module 30 of this embodiment is schematically configured from a module 33 having a display element 32, an adhesive layer 34 covering this module 33, and a paired first base material 35 and second base material 36 that sandwich the module 33 with interposition of this adhesive layer 34.

The module 33 is schematically configured from a foundational base material 31, and the display element 32 that is mounted on the foundational base material 31 and that has a display section 32a.

The display section 32a of the display element 32 is bonded and fixed to the face (hereinafter "inner face") 35a of the first base material 35 opposite the module 33 with interposition of a transparent viscous layer 37.

The adhesive layer 34 is composed of an adhesive that contains a colorant, and is colored.

Furthermore, the first base material 35 and second base material 36 are composed of transparent base material.

Thus, as the display section 32a of the display element 32 is fixed to the inner face 35a of the transparent first base material 35 with interposition of the transparent viscous layer 37, it is visible from an outer face 35b side of the first base material 35.

As the foundational base material 31, at least with respect to its surface layer, one or more materials may be selected from various conventionally known materials such as cloth, nonwoven cloth, matting, and paper—or combinations of these—composed of inorganic fiber such as glass fiber and alumina fiber; cloth, nonwoven cloth, matting, and paper—or combinations of these—composed of organic fiber such as polyester fiber and polyamide fiber; or composite base material molded by impregnating these with resin varnish; or plastic base material such as polyamide resin base material, polyester resin base material, polyolefin resin base material, polyimide resin base material, ethylene-vinyl alcohol copolymer base material, polyvinyl alcohol resin base material, polyvinyl chloride resin base material, polyvinilidine chloride resin base material, polystyrene resin base material, polycarbonate resin base material, acrylonitrile butadiene styrene copolymer resin base material, and polyester-sulfone resin base material; or material obtained by subjecting these to surface treatment such as matting treatment, corona discharge treatment, plasma treatment, ultraviolet-ray irradiation treatment, electronic-ray irradiation treatment, frame plasma treatment, ozone treatment, or various types of adhesion facilitating treatment. Among these, electrically insulated films or sheets composed of polyethylene terephthalate or polyimide are particularly well suited for use.

As the display element 32, electronic paper based on particle movement by superimposed voltage such as electrophoretic display; liquid crystal display (LCD); an electrochromic device (ECD); electroluminescence (EL); a light-emitting diode (LED); and so on, may be used.

As the adhesive agent constituting the adhesive layer 34, an adhesive agent is used which is a liquid prior to use, and which is hardened by application of external conditions such as heating, ultraviolet-ray irradiation, or electronic-ray irradiation. As this type of adhesive agent, thermo-hardening resin, ultraviolet-ray hardening resin, electronic-ray hardening resin, and so on, may be employed. A 2-pack hardening adhesives, which are hardened by reacting a hardener with a main ingredient without application of external conditions, may also be employed.

As thermo-hardening resin, for example, phenol resin, epoxy resin, polyurethane hardening resin, urea resin, melamine resin, acrylic reactive resin, and so on, may be employed.

As ultraviolet-ray hardening resin, ultraviolet-ray hardening acrylic resin, ultraviolet-ray hardening urethane acrylate resin, ultraviolet-ray hardening polyester acrylate resin, ultraviolet-ray hardening polyurethane resin, ultraviolet-ray hardening epoxy acrylate resin, ultraviolet-ray hardening imide acrylate resin, and so on, may be employed.

As electronic-ray hardening resin, electronic-ray hardening acrylic resin, electronic-ray hardening urethane acrylate resin, electronic-ray hardening polyester acrylate resin, electronic-ray hardening polyurethane resin, electronic-ray hardening epoxy acrylate resin, cationic hardening resin, and so on, may be employed.

As 2-pack hardening adhesive, mixtures of polyester resin and polyisocyanate prepolymer, mixtures of polyester polyol and polyisocyanate, mixtures of urethane and polyisocyanate, and so on, may be employed.

As specific examples of such adhesives, a 2-pack epoxy adhesive composed of a main ingredient (brand name: Aron Mighty AP-317A, manufactured by Toagosei Co.) and a hardener (brand name: Aron Mighty AP-317B, manufactured by Toagosei Co.), and a 2-pack urethane adhesive composed of a main ingredient (brand name: MLT2900, manufactured by E-Tec Co.) and a hardener (brand name: G3021-B174, manufactured by E-Tec Co.) may be employed.

As the colorant contained in the adhesive layer 34, conventionally known inorganic pigments, organic pigments, dyes, and the like is used. By means of this colorant, the adhesive layer 34 can be colored to arbitrary color.

As the first base material 35 and second base material 36, base material that is transparent and that has excellent optical transmissivity is used. As the base material composed of polyester resin such as polyethylene terephthalate (PET), glycol-modified polyethylene terephthalate (PET-G), polybutylene terephthalate (PBT), and polyethylene napthalate (PEN); base material composed of polyolefin resin such as polyethylene (PE) and polypropylene (PP); base material composed of ethylene polyfluoride resin such as vinyl polyfluoride, vinylidene polyfluoride, and ethylene poly-4-fluoride; base material composed of polyimide resin such as nylon 6, and nylon 6,6; base material composed of vinyl polymer such as polyvinyl chloride (PVC), ethylene vinyl acetate copolymer, polyvinyl alcohol, and vinilon; base material composed of acrylic resin such as methyl polymethacrylate, ethyl polymethacrylate, ethyl polyacrylate, and butyl polyacrylate; base material composed of polystyrene; base material composed of polycarbonate (PC); base material composed of polyallylate; base material composed of polyimide; base material composed of paper such as high-quality paper, thin paper, glassine paper, parchment paper; and so on, may be used. Among these base materials, from the standpoints of mechanical strength, dimensional stability and solvent resistance, it is preferable to use base material composed of polyethylene terephthalate (PET), glycol-modified polyethylene terephthalate (PET-G), polyethylene napthalate (PEN), and the like. In terms of transparency, processing suitability and cost, base material composed of polyethylene terephthalate (PET) or glycol-modified polyethylene terephthalate (PET-G) is particularly preferable.

The first base material 35 and second base material 36 may have either colorless transparency or colored transparency, but colorless transparency is preferable from the standpoint facilitating recognition of information displayed in the display section 32a of the display element 32.

As the viscosity agent constituting the viscous layer 37, a viscosity agent is used which has the properties of both a liquid and a solid, which is constantly in a wet state, which has low fluidity, and which retains its own shape. As this type of viscosity agent, acrylic resin, polyurethane resin, epoxy resin, urethane resin, natural rubber viscosity agents, synthetic rubber viscosity agents, hot-melt viscosity agents, and so on, may be employed.

As specific examples of viscosity agents, a double-sided film tape (brand name: No. 705, manufactured by Teraoka Seisakusho Co.), or a double-sided tape (brand name: TL-85F-12, manufactured by Lintec Corporation), and so on, may be employed.

The card with embedded module 30 of this embodiment is provided with the module 33 having the display element 32, the adhesive layer 34 covering this module 33, and the paired first base material 35 and second base material 36 sandwiching the module 33 with interposition of this adhesive layer 34. Furthermore, the display section 32a of the display element 32 is fixed to the first base material 35 with interposition of the transparent viscous layer 37, the first base material 35 is transparent, and the adhesive layer 34 is colored. Therefore, only the portion of the first base material 35 that overlaps the display section 32 is transparent, and this portion constitutes a display window section 38, and as a result, the display section 32a is visible from the outer face 35b side of the first base material 35. Moreover, as the display section 32a of the display element 32 is fixed to the first base material 35 by the viscous layer 37, no incorporation of air bubbles or foreign matter occurs and no adhesion blemishes arise between the viscous layer 37 and the display section 32a/first base material 35. Furthermore, as the adhesive layer 34 is colored, and exists in the aforementioned region apart from the display window section 38 between the first base material 35 and second base material 36, air bubbles and foreign matter incorporated into the adhesive layer 34 or adhesion blemishes produced in the adhesive layer 34 can be obscured. Accordingly, not only is it possible to prevent a reduction in the conforming product rate with respect to the cards with embedded modules 30 due to defects in external appearance, but it is also possible to protect the secrecy of the internal components of the card.

This embodiment exemplified a card with embedded module 30 with a transparent first base material 35 and second base material 36, but the card with embedded module of the present invention is not limited thereto. In the card with embedded module of the present invention, of the base material pair sandwiching the module, it is sufficient if at least the base material on the display section side of the display element is transparent.

Moreover, this embodiment exemplified a card with embedded module 30 provided with a member having a display element 32 as the module 33, but the card with embedded module of the present invention is not limited thereto. In the card with embedded module of the present invention, apart from having the module be a display element, it is also acceptable to provide it with electronic components such as an antenna, IC chip, battery, and diode.

Next, the manufacturing method of the card with embedded module 30 of this embodiment is described with reference to FIG. 3A and FIG. 3B.

First, a prescribed amount of the adhesive agent constituting the adhesive layer 34 is applied onto the inner face 35a of the first base material 35.

Subsequently, the viscosity agent which constitutes the viscous layer 37 formed in the shape of the display section 32a of the display element 32 is applied or pasted at the prescribed location on the inner face 35a of the first base material 35

Subsequently, the display section 32a of the display element 32 is bonded and fixed to the inner face 35a of the first base material 35 with interposition of this viscosity agent, whereby the module 33 is disposed at the prescribed position on the inner face 35a of the first base material 35.

Subsequently, after arranging the second base material 36 so that the module 33, adhesive agent, and viscosity agent are sandwiched by the first base material 35 and second base material 36, the laminar body configured from the first base material 35, second base material 36, module 33, adhesive agent, and viscosity agent is subjected to pressure treatment and treatment for hardening the adhesive agent such as heating, ultraviolet ray irradiation electronic ray irradiation, or aging (i.e., shelving it to have a hardening reaction occur over time), with the result that the card with embedded module 30 is obtained by hardening of the adhesive agent, and integration of the aforementioned laminar body.

According to the manufacturing method of the card with embedded module 30 of this embodiment, as the display section 32a of the display element 32 is bonded to the inner face 35a of the first base material 35 with interposition of the viscosity agent, air bubbles and foreign matter are not incorporated between the viscosity layer 32 [sic] and the display section 32a/first base material 35, and there is also no occurrence of adhesion blemishes. Accordingly, it is possible to obtain a card with embedded module 30 having excellent external appearance without using techniques such as vacuum defoaming.

INDUSTRIAL APPLICABILITY

As described above, according to the present invention, it is possible to offer a card with embedded module, which incorporates a display element as an electronic component, which renders the display section of this display element visible from the outside, and which is easy to manufacture.

The invention claimed is:

1. A card, comprising a embedded module comprising:
a module comprising a display element;
an adhesive layer covering at least part of the module;
a paired base material sandwiching the module with interposition of the adhesive layer; and
a transparent portion disposed so as to face a display section of the display element,
wherein the transparent portion is comprised in a transparent viscous layer disposed on a surface of the display section,
wherein the display section of the display element is fixed to the base material with interposition of the viscous layer, and
wherein at least the base material on a side of the display section of the paired base material is transparent.

2. A method of manufacturing a card with an embedded module, the method comprising:
applying an adhesive agent comprised in an adhesive layer to one face of at least one selected from the group consisting of a first base material and a second base material;
applying or pasting a viscosity agent comprised in a viscous layer, which is comprised in a transparent section and formed in the shape of a display section of a display element, onto a face of at least one of selected from the group consisting of the first base material and the second base material;
disposing the module on one face of the viscous layer so that the display section of the display element faces the viscous layer sandwiching the module and the adhesive agent are sandwiched by the first base material and the second base material and
after the sandwiching, integrating the first base material, the second base material, the module, and the adhesive agent by hot-pressing treatment,
wherein the card manufactured comprises an embedded module comprising a display element, the adhesive layer covering at least a part of the module, the first base material and the second base material sandwiching the module with interposition of the adhesive layer, and the transparent portion disposed so as to face the display section of the display element.

* * * * *